United States Patent
Pamulaparthy et al.

(10) Patent No.: US 9,140,576 B2
(45) Date of Patent: Sep. 22, 2015

(54) DEMAND RESPONSE WITHOUT TIME-OF-USE METERING

(75) Inventors: Balakrishna Pamulaparthy, Andhra Pradesh (IN); Manish Kumar Sharma, Andhra Pradesh (IN); Aditya Gupta, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 688 days.

(21) Appl. No.: 13/356,227

(22) Filed: Jan. 23, 2012

(65) Prior Publication Data
US 2013/0190942 A1    Jul. 25, 2013

(51) Int. Cl.
*G06F 19/00* (2011.01)
*G01R 21/00* (2006.01)
*H02J 1/04* (2006.01)
*H02J 3/14* (2006.01)
*G01D 4/00* (2006.01)

(52) U.S. Cl.
CPC ............ *G01D 4/002* (2013.01); *Y02B 90/241* (2013.01); *Y02B 90/244* (2013.01); *Y04S 20/32* (2013.01); *Y04S 20/327* (2013.01)

(58) Field of Classification Search
CPC ..... Y04S 10/54; Y04S 20/222; Y04S 20/322; Y04S 20/46; Y04S 40/126; Y02B 70/3225; Y02B 90/242; Y02B 90/244; Y02B 90/2653; Y10T 307/438; Y10T 307/604; G01D 4/004
USPC ......... 700/297, 275, 276, 278, 286, 291, 295, 700/296; 702/57, 60–62; 705/63; 307/11, 307/31, 35, 43, 52, 62; 340/870.01, 870.02
See application file for complete search history.

(56) References Cited

U.S. PATENT DOCUMENTS

| | | | | |
|---|---|---|---|---|
| 3,862,430 A * | 1/1975 | Lenhart et al. | ................. | 307/35 |
| 4,370,723 A * | 1/1983 | Huffman et al. | ............. | 700/295 |
| 4,390,876 A * | 6/1983 | Bjorklund et al. | ............ | 340/3.7 |
| 5,572,438 A * | 11/1996 | Ehlers et al. | ................. | 700/295 |
| 7,254,497 B2 * | 8/2007 | Downey et al. | ................. | 702/64 |
| 7,348,769 B2 | 3/2008 | Ramirez | | |
| 7,532,955 B2 | 5/2009 | Dougherty | | |
| 7,547,990 B2 * | 6/2009 | Varzhabedian | ................ | 307/66 |
| 7,705,484 B2 * | 4/2010 | Horst | ............................. | 307/35 |
| 7,715,951 B2 * | 5/2010 | Forbes et al. | .................. | 700/291 |
| 8,032,233 B2 * | 10/2011 | Forbes et al. | .................. | 700/22 |
| 8,068,938 B2 * | 11/2011 | Fujita | ........................... | 700/295 |

(Continued)

FOREIGN PATENT DOCUMENTS

EP       2107518 A1     3/2008

OTHER PUBLICATIONS

Palensky, "Demand Side Management: Demand Response,Intelligent Energy Systems, and Smart Loads", IEEE, Aug. 2011.*

*Primary Examiner* — Crystal J Barnes-Bullock
(74) *Attorney, Agent, or Firm* — Sutherland Asbill & Brennan LLP

(57) ABSTRACT

Embodiments of the invention can provide systems and methods for controlling the load of demand response metering devices. According to one embodiment of the invention, a system can be provided. The system can be operable to receive a load limit, store the load limit, determine a load demand of a location, provide an alarm when the load demand is greater than the load limit, and restrict electricity to the location when the load demand remains greater than the load limit for a predetermined amount of time.

20 Claims, 3 Drawing Sheets

(56) References Cited

U.S. PATENT DOCUMENTS

| | | | |
|---|---|---|---|
| 8,471,724 B2* | 6/2013 | Morris | 340/870.02 |
| 2004/0133314 A1* | 7/2004 | Ehlers et al. | 700/276 |
| 2006/0064205 A1* | 3/2006 | Ying | 700/286 |
| 2008/0086394 A1* | 4/2008 | O'Neil et al. | 705/30 |
| 2009/0109056 A1* | 4/2009 | Tamarkin et al. | 340/870.02 |
| 2009/0198384 A1* | 8/2009 | Ahn | 700/292 |
| 2009/0295594 A1* | 12/2009 | Yoon | 340/825.36 |
| 2009/0326725 A1* | 12/2009 | Carlson et al. | 700/291 |
| 2010/0010683 A1* | 1/2010 | Kates | 700/293 |
| 2010/0088261 A1* | 4/2010 | Montalvo | 706/15 |
| 2010/0089909 A1* | 4/2010 | Besore et al. | 219/720 |
| 2010/0262313 A1 | 10/2010 | Chambers et al. | |
| 2011/0016200 A1 | 1/2011 | Koch | |
| 2011/0093127 A1* | 4/2011 | Kaplan | 700/292 |
| 2011/0095017 A1 | 4/2011 | Steurer | |
| 2011/0125337 A1* | 5/2011 | Zavadsky et al. | 700/291 |
| 2013/0268136 A1* | 10/2013 | Cox et al. | 700/295 |

* cited by examiner

DEMAND RESPONSE WITHOUT TIME-OF-USE METERING

FIELD OF THE INVENTION

Embodiments of the invention relate generally to load control, and more particularly to load control of demand response metering devices.

BACKGROUND OF THE INVENTION

A wide variety of utility meters are configured to measure and/or control electricity consumption at consumer locations. Additionally, the world has seen increased electricity needs and advancements in grid management technologies. For example, smart meters may be configured to determine time-of-use (TOU) information for particular sites. In such cases, demand response techniques may be utilized to manage and/or control usage. However, demand increases beyond generation may lead to losses and/or poor efficiency of the grid. Further, many areas still have yet to employ TOU meters. Given the growing number of areas attempting to employ demand response techniques, there is an opportunity for techniques that can perform demand response without TOU metering.

BRIEF DESCRIPTION OF THE INVENTION

Some or all of the above needs and/or problems may be addressed by certain embodiments of the invention. Disclosed embodiments may include load control for demand response metering devices. According to one embodiment of the invention, there is disclosed a system operable to receive a load limit, store the load limit, determine a load demand of a location, provide an alarm when the load demand is greater than the load limit, and restrict electricity to the location when the load demand remains greater than the load limit for a predetermined amount of time.

According to another embodiment of the invention, there is disclosed a method for receiving a load limit and storing the load limit in at least one memory; determining a load demand of a location; providing an alarm when the load demand is greater than the load limit; and restricting electricity to the location when the load demand remains greater than the load limit for a predetermined amount of time.

Further, according to another embodiment of the invention, there is disclosed one or more computer-readable media storing instructions for receiving a peak load limit and storing the peak load limit in at least one memory; determining a load demand of a location and storing the load demand in the at least one memory; and while during a peak load period; determining when the load demand is greater than the peak load limit; generating an alarm when the load demand is greater than the peak load limit; opening a first relay to restrict electricity to the location when the load demand remains greater than the peak load limit for a first predetermined amount of time; and opening at least a second relay to further restrict electricity to the location when the load demand remains greater than the peak load limit for a second predetermined amount of time.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Figure 1:
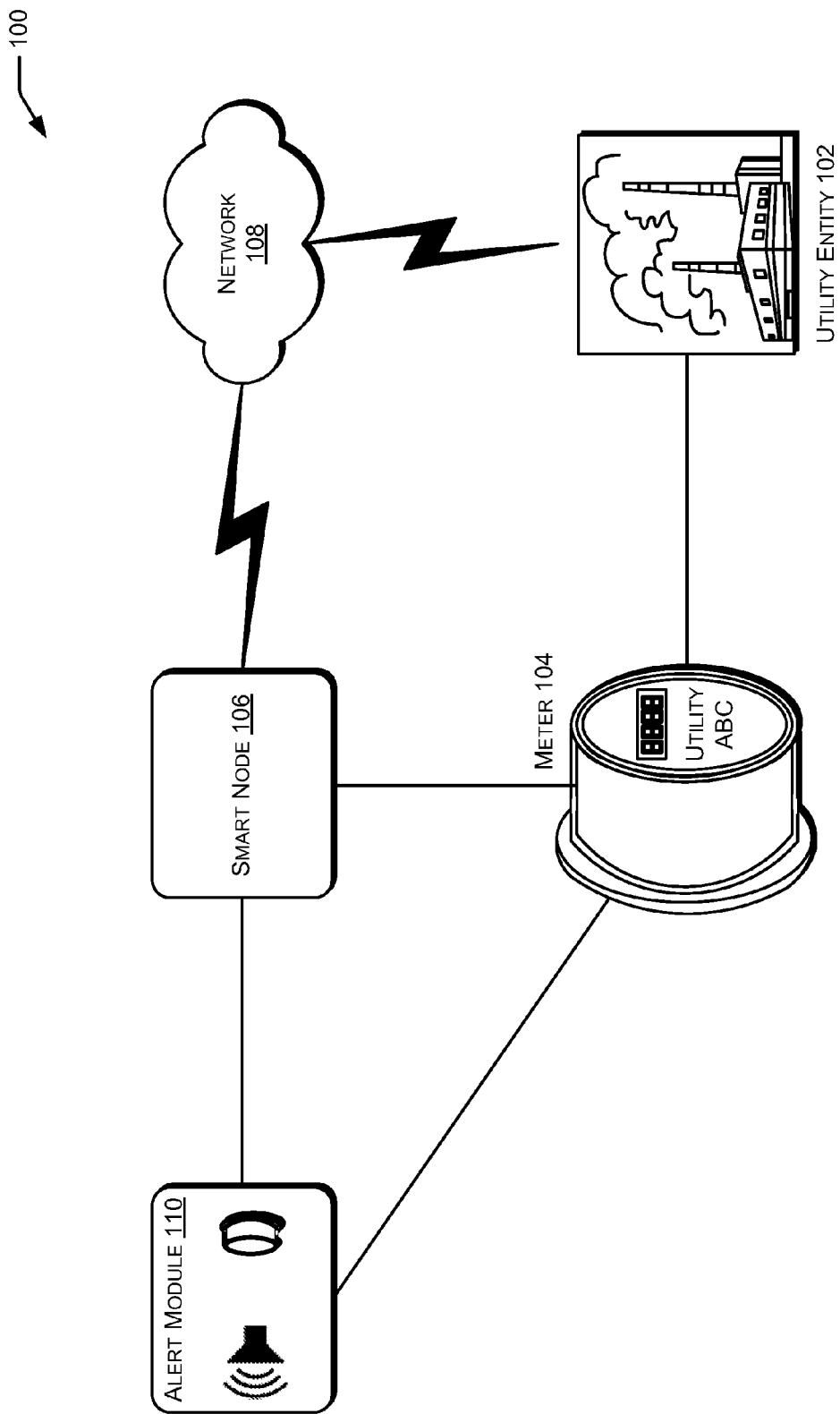
FIG. 1 is a block diagram of an illustrative environment with which load control of demand response metering devices may be implemented, according to an embodiment of the invention.

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. Like numbers refer to like elements throughout.

Illustrative embodiments of the invention are directed to, among other things, controlling loads of one or more metering devices. In some examples, the metering devices may include network devices such as, but not limited to, demand response meters, smart meters, advanced metering infrastructure (AMI) devices, and/or home area network (HAN) devices. In some aspects, in particular, illustrative embodiments of the invention may be directed towards providing a smart node to be communicatively coupled to a metering device and/or providing a metering device with an integrated smart node. In either case, illustrative embodiments of the invention may include determining and/or receiving one or more peak load limits for each of one or more consumer locations. For example, the peak load limit may be determined and/or received by one or more computing devices, by a service provider, by the electricity provider, by the smart node, and/or by a smart metering device with an integrated smart node.

As an overview, utility companies or other electricity providers generate and/or provide electricity to a grid. The grid may provide electricity to customers who consume the electricity or to other utility companies. Additionally, in some examples, a grid may transmit electricity to a headend server for controlling one or more other sub-grids, electricity networks, and/or other consumers or customers. Further, in some examples, the headend server may provide instructions to one or more networks of devices, each network including one or more metering devices, smart meters, and/or household appliances. As such, the headend server may be configured to provide electricity and/or to trip relays in order to reduce the load. For example, a 10 A, 20 A, 40 A, 100 A, etc., relay may be tripped to reduce the amount of electricity consumed at the location. In some instances, this may be especially useful during peak usage time.

In some examples, a metering device at a location may determine an amount of load required (i.e., the load demand) at the location in real-time. At the same time, or in some examples prior to this determination, the metering device and/or smart node may be programmed with the peak load limit. In some embodiments, the peak load limits may be different for each location, for each metering device, for each smart node, for each customer, for each region, and/or for each grid. Further, in some instances, when the determined load demand is greater than the programmed peak load limit, an alarm may be provided to the customer or consumer. The alarm may be in the form of an audio alert, a video alert, a text message (e.g., a short message service (SMS) and/or a multimedia messaging service (MMS) message), a telephone call, an email, a voicemail, a hypertext markup language (HTML) message such as, but not limited to, a Web page, a pop-up, etc., and/or any other way of communication that may indicate to a customer that an action may be requested.

Further, in some examples, the smart node and/or the service provider may restrict electricity to the location when the load demand remains greater than the load limit for a predetermined amount of time. In this way, a consumer may be given an opportunity to manually reduce consumption loads at the location after receiving the alarm but prior to the restriction of electricity. In some cases, the predetermined amount of time may also be determined by the service provider and/or may change or otherwise fluctuate based on peak times, demand response, and/or demand loads. Further, in some examples, restricting electricity may include, but is not limited to, actuating, tripping, and/or otherwise activating a relay at the meter, at a smart node attached to the meter, and/or at some other distribution point. In some instances, auxiliary relays may be actuated first in order to allow maintenance of critical elements at the location. However, if load demands are not reduced eventually at the location, the smart node, meter, and/or distribution point may actuate main relays to completely cut off electricity at the location.

The technical effects of embodiments of the invention may include shedding utility loads during peak power times when TOU meters are not in place, thus reducing the risk of power loss on the grid.

FIG. 1 provides an illustrative overview of one environment 100, in which aspects and features disclosed herein may be implemented. The environment 100 may include a utility entity 102 (e.g., an electricity producer, an electricity provider, an electricity distributor, etc.) configured to provide electricity to one or more meters 104. In some aspects, each meter 104 may be coupled to a location and may be configured to receive, monitor, measure, record, display and/or control an amount of electricity consumed at the location. In some aspects, as noted above, the meter 104 may include an integrated smart node, such as smart node 106. However, in other examples, the smart node 106 (as shown) may be a separate device from the meter 104. In this case, however, the smart node 106 may be communicatively coupled to the meter 104 in order to control and/or provide signals/messages/instructions to the meter 104. In either example, the meter 104 and/or the smart node 106 may be in communication with the utility entity 102 via one or more networks 108.

Additionally, in some examples, an alert module 110 may be communicatively coupled to the meter 104 and/or the smart node 106. The alert module 110 may be configured to provide alerts and/or alarms via any known communication method. Additionally, the smart node and/or the meter may periodically (e.g., in real-time) check the load demand at the location and compare it to a predetermined peak load limit. As such, when the load demand at the location reaches or surpasses the predetermined peak load limit, in some examples only during peak times, an alarm and/or alert may be provided to the consumer or customer that operates, owns, resides at, and/or controls the location. The alarm and/or alert may indicate to the consumer that the consumer is reaching or have reached the peak load limit. The smart node 106 may wait a predetermined amount of time after the alarm or alert has been provided to once again check the location's load demand. If the demand has not been reduced, in some examples to an amount below the peak load limit, the smart node 106 and/or the meter 104 may restrict electricity to the location. In some examples, a button or other switch may be activated manually at the location to indicate that the demand has been reduced. At this point, the meter 104 and/or the smart node 106 may once again check the local demand and determine whether to reconnect the location.

In one illustrative configuration, the meter 104 and/or the smart node 106 may be configured with a parameter "Y," which is equal to the maximum allowable KW at peak load conditions for the specific location or in general (e.g., for all locations on the grid). In some examples, the utility entity 102 may define "Y" and provide it to the meter 104 and/or the smart node 106. Additionally, the maximum allowable loading limit "Y" (in KWs) may vary seasonally and/or periodically. Further, these limits may be estimated from past demand records, load profiles, available capacity information, and/or peak load estimates. In some examples, the peak limiting details (i.e., "Y") may be sent to the meter 104 and/or the smart node 106 via a general packet radio service (GPRS) communication, a Wi-Fi™ signal, a power line carrier communication (PLCC), an AMI communication, a Global System for Communications (GSM™) communication, a low power radio communication, or any other communication method. Further, in some examples, when a smart node 106 is utilized, the smart node 106 may be placed at the electricity distribution pole (e.g., at the top of the pole) in order to reduce potentially harmful radio waves from reaching customers.

Additionally, in one illustrative use case, the smart node 106 may be programmed with "Y" (i.e., the peak load limit in KW), while the meter 104 may be configured to calculate "D," defined as the total demand (in KW) at the location, instantaneously and in real-time. The meter 104 may then continuously, or at predetermined timing intervals, transmit "D" to the smart node 106. During peak load conditions, a peak limiting flag may be set by the smart node 106 and/or the utility entity 102. Then, when the smart node 106 detects a load "D" which is greater than the programmed "Y," an alert may be communicated to the consumer via the alert module 110. In some examples, the initial alert may be an alarm tone transmitted via a speaker. The speaker may be, but is not limited to, a fine-tuned speaker, and the alarm tone may be, but is not limited to, a 10 second, a 20 second, a 30 second, etc., duration tone.

In some aspects, the smart node 106 may be equipped with a GPRS communication board. In this case, the smart node 106 may place a telephone call or send a text message (or other type of message) to the customer associated with the location, at the same time or after the alarm has been provided. The customer may then be given some time to manually reduce the load consumption at the location. The amount of time may be predetermined and/or may fluctuate based on current conditions on the grid. After a predetermined amount of time, the smart node 106 may recheck the present demand, "D," against the preset "Y." When it is determined that D>Y, the smart node 106 may trip a 40 A relay (or some other auxiliary relay) to reduce the amount of electricity provided to the location. The smart node 106 may then recheck "D" against the preset "Y" and, if "D" is still greater than "Y," the smart node 106 may trip a main relay (e.g., a 100 A relay) or the smart node 106 may send a message to the meter 104 to trip the main relay, in order to fully disconnect electricity from the location.

Further, once the main relay has been disconnected, the customer may reduce the load at the location to a level below "Y," and then activate a switch at the alert module 110, select a button on the alert module 110, or otherwise indicate that local loads have been reduced. Upon this event, electricity may once again be provided to the location by the meter 104 and/or the smart node 106 by reconnecting the main relay. The meter 104 and/or the smart node 106 may then continue to check "D" against "Y" until the peak limiting flag is disabled.

Figure 2:
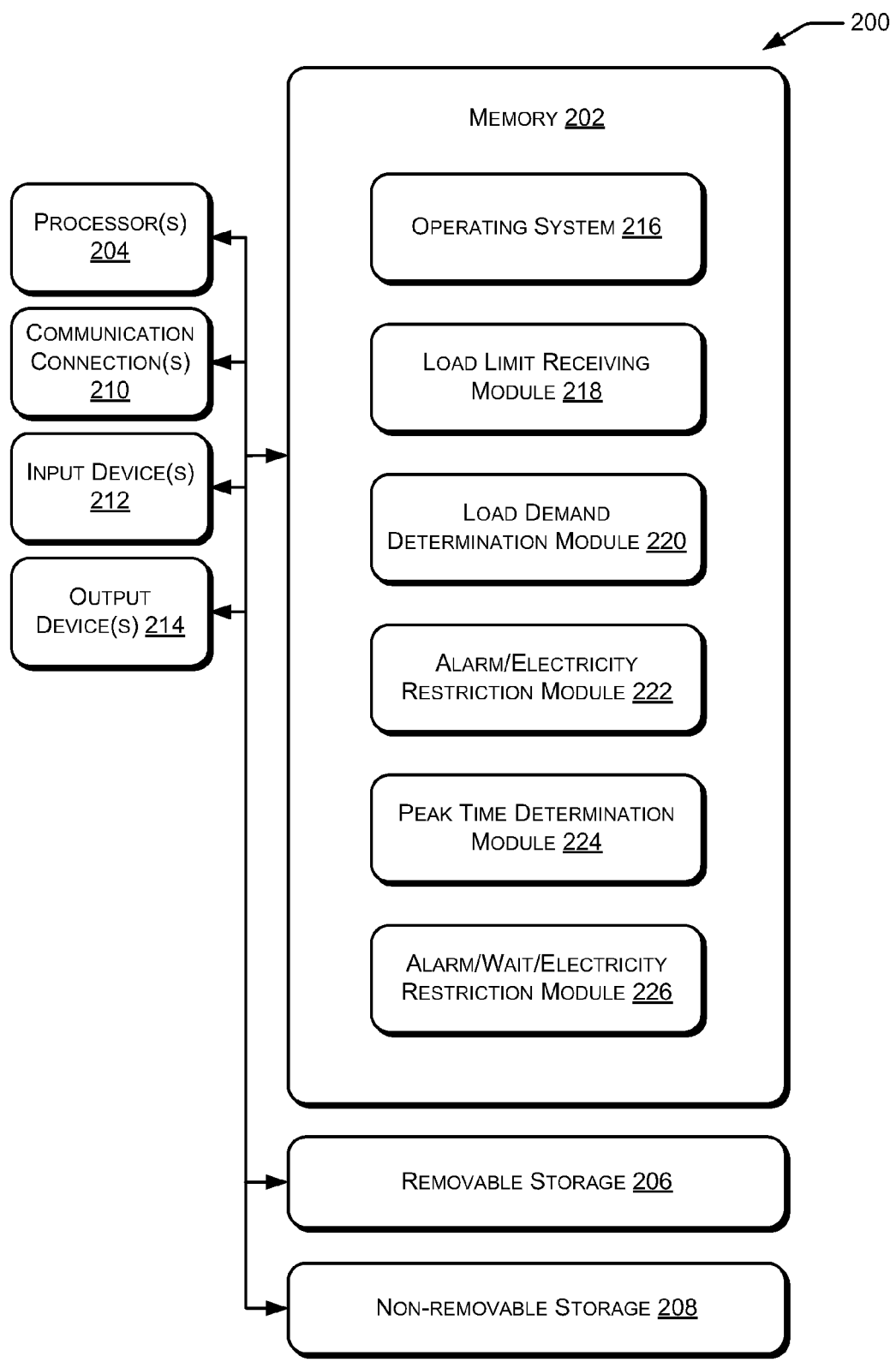
FIG. 2 is a block diagram of an illustrative computer system with which load control of demand response metering devices may be implemented, according to an embodiment of the invention.

FIG. 2 provides an illustrative overview of one computing system 200, in which load control of demand response metering devices may be implemented. The computing system 200 may be configured as any suitable computing device capable of implementing load control, such as, but not limited to, the meter 104 and/or the smart node 106 of FIG. 1. By way of example and not limitation, suitable computing devices may include personal computers (PCs), servers, server farms, data centers, or any other device capable of storing and executing all or part of the illustrative environment 100.

In one illustrative configuration, the computing system 200 comprises at least a memory 202 and one or more processing units (or processor(s)) 204. The processor(s) 204 may be implemented as appropriate in hardware, software, firmware, or combinations thereof. Software or firmware implementations of the processor(s) 204 may include computer-executable or machine-executable instructions written in any suitable programming language to perform the various functions described.

Memory 202 may store program instructions that are loadable and executable on the processor(s) 204, as well as data generated during the execution of these programs. Depending on the configuration and type of computing system 200, the memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Memory 202, removable storage 206, and non-removable storage 208 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVDs) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable media.

However, in other embodiments, computer-readable communication media may include computer-readable instructions, program modules, or other data transmitted within a data signal, such as a carrier wave, or other transmission. However, as used herein, computer-readable storage media does not include computer-readable communication media.

The computing system 200 may also contain communication connection(s) 210 that allow the computing system 200 to communicate with a stored database, another computing device or server, user terminals, and/or other devices on a network, such as the meter 104 of FIG. 1. The computing system 200 may also include input device(s) 212 such as a keyboard, mouse, pen, voice input device, touch input device, etc., and output device(s) 214, such as a display, speakers, printer, etc.

Turning to the contents of the memory 202 in more detail, the memory 202 may include an operating system 216 and one or more application programs or services for implementing the features disclosed herein including a load limit receiving module 218. The load limit receiving module 218 may be configured to receive and/or determine load limits for peak conditions. That is, in some examples, the load limit receiving module 218 may receive load limits from one or more service providers and/or utility companies such as, but not limited to, the utility entity 102 of FIG. 1. However, in other examples, the load limit receiving module 218 may actually determine the load limit based on past demand records, load profiles, available grid capacity, and/or peak load estimates.

The memory 202 may also include a load demand determination module 220 and an alarm/electricity restriction module 222. The load demand determination module 220 may be configured to determine local load demands. That is, in some examples, the load demand determination module 220 may read or otherwise calculate the load demand at the location of the meter 104. However, in other examples, the load demand determination module 220 may actually receive the local load demand from the meter 104. Additionally, the alarm/electricity restriction module 222 may be configured to provide alarms, alerts, or other communications to the customers/consumers when the load demand reaches or exceeds the load limit. In addition, the alarm/electricity restriction module 222 may be configured to restrict electricity to the location being monitored by tripping, activating, or otherwise disconnecting relays that are located within the meter 104 and/or the smart node 106 of FIG. 1.

Further, the memory 202 may include a peak time determination module 224 and an alarm/wait/electricity restriction module 226. In some aspects, the peak time determination module 224 may be configured to determine when a peak load condition exists. For example, the peak time determination module 224 may determine whether the peak flag has been set by the utility entity 102 and/or whether the current time and/or date matches a predefined peak condition time and/or date. In addition, the alarm/wait/electricity restriction module 226 may be configured to restrict electricity to the location being monitored by tripping, activating, or otherwise disconnecting relays that are located within the meter 104 and/or the smart node 106 of FIG. 1 upon waiting a predetermined amount of time after the alarm has been activated. In this way, the customer/consumer may be given the opportunity to manually reduce the local load demand before electricity is restricted.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example environment 100 and computing system 200 shown in FIGS. 1 and 2 are provided by way of example only. Numerous other operating environments, system architectures, and device configurations are possible. Accordingly, embodiments of the present invention should not be construed as being limited to any particular operating environment, system architecture, or device configuration.

Figure 3:
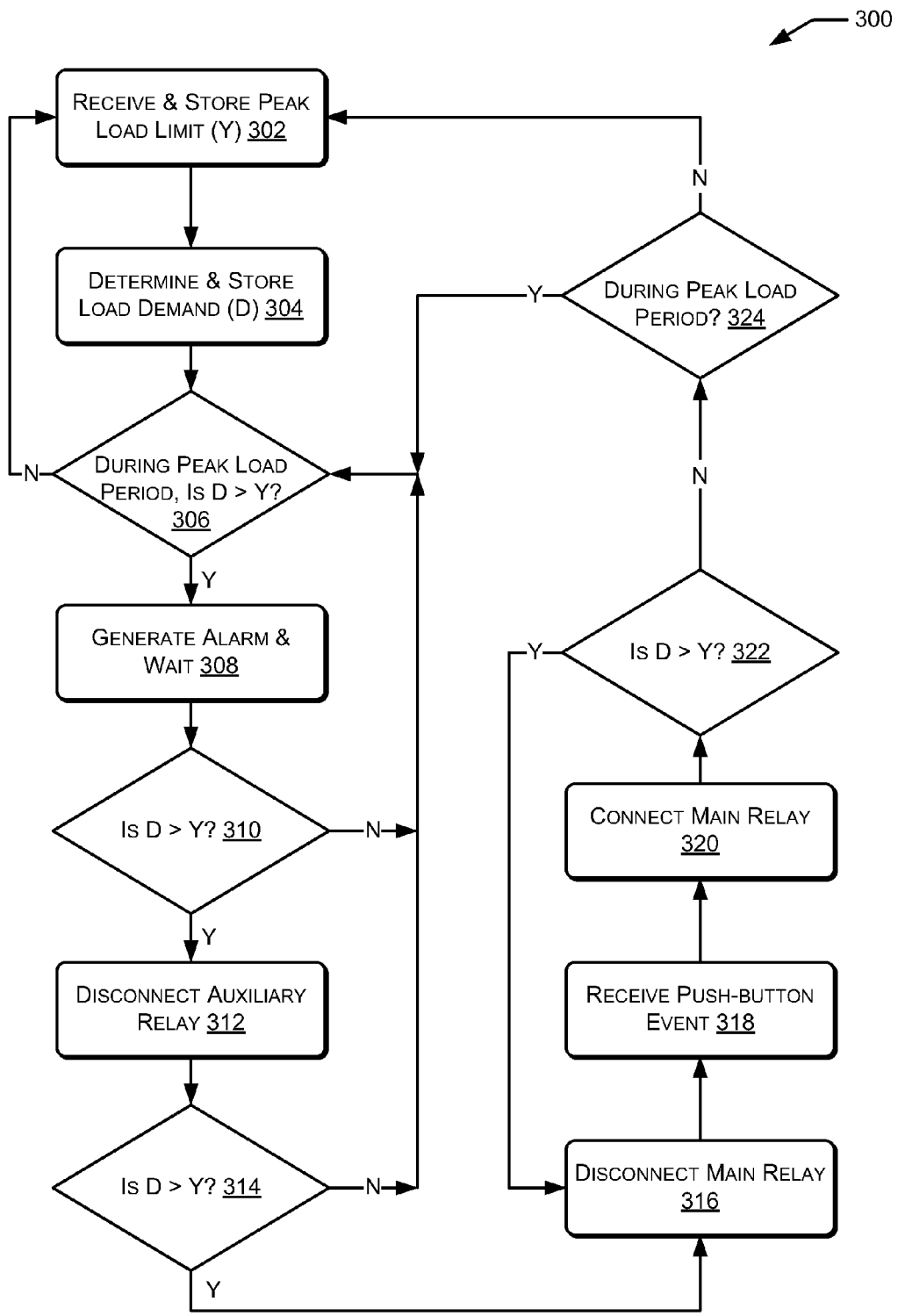
FIG. 3 is a flow diagram illustrating details of an example method for implementing load control of demand response metering devices, according to an embodiment of the invention.

FIG. 3 is a flow diagram of an illustrative process 300 for implementing the load limit alarm and load restriction techniques, as described with reference to FIGS. 1 and 2. In one example, the illustrative meter 104 and/or the smart node 106 of FIG. 1 may perform any or all of the operations of the process 300. This process is illustrated as a logical flow diagram, where each operation represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302 in which the process 300 may receive and store a peak load limit "Y." As noted above, in some examples, "Y" may be stored in the memory 202 of FIG. 2. Additionally, the process 300 may then determine (and/or receive) a local load demand "D," at block 304. In some aspects, the data may be received by an application of a computing device, such as the smart node 106 of FIG. 1 or the computing system 200 of FIG. 2, and may be stored in a memory location, such as the memory 202 of FIG. 2. At block 306, the process 300 may determine whether a peak load condition is occurring and, if so, whether D>Y. If a peak load condition is not occurring (in some examples, indicated by a peak load flag being set), the process 300 may return to block 302. Similarly, if D≤Y (or if D is not >Y), the process 300 may return to block 302. However, when the conditions are met (i.e., peak load period and D>Y) at block 306, the process 300 may generate an alarm and wait a predetermined time period at block 308. After waiting the predetermined time period and generating the alarm, the process 300 may again determine whether D>Y at block 310. That is, the customer/consumer may have reduced the local load demand while the process 300 was waiting and the process 300 may recheck the local load demand after waiting.

If the process 300 determines at block 310 that the local load was reduced and, now D≤Y, the process 300 may return to block 306. Otherwise, if D is still greater than Y, the process 300 may disconnect an auxiliary relay at block 312. In some examples, the auxiliary relay may be, but is not limited to, a 40 A relay for disconnecting non-critical loads. At block 314, the process 300 may again determine whether D>Y. If not, the process 300 may once again return to block 306. However, if D is still greater than Y, the process 300 may disconnect a main relay (e.g., a 100 A relay) at block 318. This may, and in most occasions will, disconnect all power from the location. The process 300 may then receive a push-button event at block 316. In some examples, the push-button event may coincide with the customer/consumer pushing a button on the alert module 110 of FIG. 1 indicating that the customer/consumer has reduced the local loads to be in compliance with the peak load limit.

In some examples, once the process 300 receives the push-button event at block 318, the process 300 may reconnect the main relay (i.e., reconnecting power to the location) at block 320. However, the process 300 may once again determine whether the location is in compliance with the peak load limit by once again determining whether D>Y at block 322. Again, if D>Y (i.e., the consumer/customer indicated that the local loads had been reduced when in reality, the local load demand was still greater than the peak load limit) at block 322, the process 300 may disconnect the main relay at block 316. However, if the local load demand is still in compliance with the peak load limit, the process 300 may instead determine whether the peak load period is still occurring at block 324. That is, the process 300 may check the peak flag and/or determine whether the current date/time is a peak load date/time at block 324. If the peak load period is still occurring, the process 300 may return to block 306. However, if the peak load period has ended, the process 300 may return to block 302 to receive and store a new peak load limit "Y2."

Illustrative systems and methods of load restriction without TOU metering are described above. Some or all of these systems and methods may, but need not, be implemented at least partially by an architecture such as that shown in FIGS. 1, 2, and/or 3. It should be understood that certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system, comprising:
    at least one memory that stores computer-executable instructions;
    at least one processor configured to access the at least one memory, wherein the at least one processor is configured to execute the computer-executable instructions to:
        receive a load limit and store the load limit in the at least one memory, wherein the load limit is determined based at least in part on past demand records;
        determine a load demand of a location;
        provide an alarm when the load demand is greater than the load limit;
        open a first relay to restrict electricity to the location when the load demand remains greater than the load limit for a first predetermined amount of time after the alarm is provided;
        open at least a second relay to further restrict electricity to the location when the load demand remains greater than the load limit for a second predetermined amount of time; and
        determine, after the first predetermined amount of time and the second predetermined amount of time have elapsed, the load demand at the location, wherein if the load demand is less than the load limit, remove restrictions to the electricity to the location, and if the load demand is greater than the load limit, fully disconnect electricity from the location; and a switch at the location that, when manually activated, indicates that the load demand has been reduced.

2. The system of claim 1, wherein the load limit comprises a load limit for a peak load time.

3. The system of claim 1, wherein the load limit is received from a remote location or a local interface via a wired or wireless interface.

4. The system of claim 1, wherein the determination of the load demand comprises receiving the load demand from a meter of the location or from a meter of a consumer associated with the location.

5. The system of claim 1, wherein the restriction of electricity comprises actuating at least one relay.

6. The system of claim 5, wherein the at least one relay comprises a relay to disconnect all electricity from the location or a relay to disconnect less than all electricity from the location.

7. The system of claim 1, wherein the at least one processor is further configured to execute the computer-executable instructions to provide the alarm or the restriction of electricity only during peak load times.

8. The system of claim 7, wherein the alarm comprises at least one of an audio tone, an image, a video, a text message, an email, or a pager message.

9. The system of claim 1, wherein the at least one processor is further configured to execute the computer-executable instructions to provide the alarm when the load demand is greater than the peak load limit and during peak load times, and restrict the electricity only when the load demand remains greater than the peak load limit for the predetermined amount of time and while during peak load times.

10. The system of claim 9, wherein the predetermined amount of time is provided by a utility entity and is based at least in part on peak load data.

11. A method, comprising:
receiving a load limit and storing the load limit in at least one memory, wherein the load limit is determined based at least in part on past demand records;
determining a load demand of a location;
providing an alarm when the load demand is greater than the load limit;
opening a first relay to restrict electricity to the location when the load demand remains greater than the load limit for a first predetermined amount of time after the alarm is provided;
opening at least a second relay to further restrict electricity to the location when the load demand remains greater than the load limit for a second predetermined amount of time;
determining, after the first predetermined amount of time and the second predetermined amount of time have elapsed, the load demand at the location, wherein if the load demand is less than the load limit, remove restrictions to the electricity to the location, and if the load demand is greater than the load limit, fully disconnect electricity from the location; and
manually activating a switch at the location to indicate that the load demand has been reduced.

12. The method of claim 11, wherein the load limit comprises a load limit for a peak load time.

13. The method of claim 11, wherein the load limit is received from a remote location or a local interface via a wireless or wired interface.

14. The method of claim 11, wherein determining the load demand comprises receiving the load demand from a meter of the location or a meter of a consumer associated with the location.

15. The method of claim 11, wherein restricting electricity comprises actuating at least one relay.

16. The method of claim 15, wherein the at least one relay comprises a relay to disconnect all electricity from the location or a relay to disconnect less than all electricity from the location.

17. The method of claim 11, further comprising providing the alarm or the restriction of electricity only during peak load times.

18. The method of claim 11, further comprising providing the alarm when the load demand is greater than the peak load limit and during peak load times, and restricting the electricity only when the load demand remains greater than the peak load limit for the predetermined amount of time and while during peak load times.

19. A method, comprising:
receiving, by an input device of a computing device and from a utility entity, a peak load limit and storing the peak load limit in at least one memory;
determining, by at least one processor of the computing device, a load demand of a location and storing the load demand in the at least one memory, wherein the load limit is determined based at least in part on past demand records; and
while during a peak load period:
determining, by the at least one processor, when the load demand is greater than the peak load limit;
generating, by the at least one processor, an alarm when the load demand is greater than the peak load limit;
opening, by the at least one processor, a first relay to restrict electricity to the location when the load demand remains greater than the peak load limit for a first predetermined amount of time after the alarm is generated;
opening, by the at least one processor, at least a second relay to further restrict electricity to the location when the load demand remains greater than the peak load limit for a second predetermined amount of time;
determining, by the at least one processor, after the first predetermined amount of time and the second predetermined amount of time have elapsed, the load demand at the location, wherein if the load demand is less than the peak load limit, remove restrictions to the electricity to the location, and if the load demand is greater than the peak load limit, fully disconnect electricity from the location; and
manually activating a switch at the location to indicate that the load demand has been reduced.

20. The method of claim 19, further comprising:
receiving, by the at least one processor, an indication that the load demand of the location has reduced after opening the first relay or at least the second relay;
closing, by the at least one processor, the first relay or at least the second relay;
determining, by the at least one processor, when the load demand is greater than the peak load limit; and
recursively opening, by the at least one processor, the first relay or at least the second relay, receiving the indication, closing the first relay or at least the second relay, and determining when the load demand is greater than the peak load limit until the load demand is less than the peak load limit.

* * * * *